US011572314B2

(12) United States Patent
Chen et al.

(10) Patent No.: US 11,572,314 B2
(45) Date of Patent: Feb. 7, 2023

(54) PREPARATION METHOD FOR YTTRIUM ALUMINUM GARNET CONTINUOUS FIBER

(71) Applicant: SHANDONG UNIVERSITY, Jinan (CN)

(72) Inventors: Dairong Chen, Jinan (CN); Qiang Meng, Jinan (CN); Yuna Jia, Jinan (CN); Xiuling Jiao, Jinan (CN); Chao Zhu, Jinan (CN); Luning Chai, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 701 days.

(21) Appl. No.: 16/499,807

(22) PCT Filed: Sep. 29, 2017

(86) PCT No.: PCT/CN2017/104314
§ 371 (c)(1),
(2) Date: Sep. 30, 2019

(87) PCT Pub. No.: WO2018/188280
PCT Pub. Date: Oct. 18, 2018

(65) Prior Publication Data
US 2020/0071231 A1 Mar. 5, 2020

(30) Foreign Application Priority Data
Apr. 10, 2017 (CN) .......................... 201710228775.8

(51) Int. Cl.
| | | |
|---|---|---|
| D01D 10/02 | (2006.01) | |
| D02G 3/16 | (2006.01) | |
| D02J 13/00 | (2006.01) | |
| C04B 35/44 | (2006.01) | |
| C04B 35/505 | (2006.01) | |
| C04B 35/622 | (2006.01) | |
| C04B 35/624 | (2006.01) | |
| C04B 35/634 | (2006.01) | |
| D01D 1/02 | (2006.01) | |
| D01D 5/04 | (2006.01) | |
| D01F 9/08 | (2006.01) | |
| C04B 35/626 | (2006.01) | |

(52) U.S. Cl.
CPC ............ *C04B 35/44* (2013.01); *C04B 35/505* (2013.01); *C04B 35/624* (2013.01); *C04B 35/6263* (2013.01); *C04B 35/62231* (2013.01); *C04B 35/62236* (2013.01); *C04B 35/6342* (2013.01); *C04B 35/63444* (2013.01); *D01D 1/02* (2013.01); *D01D 5/04* (2013.01); *D01F 9/08* (2013.01); *C04B 2235/3218* (2013.01); *C04B 2235/3222* (2013.01); *C04B 2235/3225* (2013.01); *C04B 2235/764* (2013.01); *D10B 2101/08* (2013.01)

(58) Field of Classification Search
CPC ........ C04B 35/62231; C04B 35/62236; C04B 35/624; C04B 35/6263; C04B 35/6342; C04B 2235/3218; C04B 2235/3225; D01D 5/04; D01D 10/02; D01F 9/08; D02G 3/16; D02J 13/00; D10B 2101/08
USPC ................................ 264/1.22, 623, 639, 654
See application file for complete search history.

(56) References Cited

U.S. PATENT DOCUMENTS 5,378,665 A * 1/1995 Chen .................. C04B 35/62236
501/86

FOREIGN PATENT DOCUMENTS

JP H0641819 A * 2/1994 ............... D01F 9/08

OTHER PUBLICATIONS

Translation of JP-H0641819-A (published on Feb. 15, 1994).*

* cited by examiner

*Primary Examiner* — Leo B Tentoni
(74) *Attorney, Agent, or Firm* — CBM Patent Consulting, LLC

(57) ABSTRACT

A preparation method for an yttrium aluminum garnet continuous fiber. The method prepares a spinnable precursor sol by utilizing an $Al_{13}$ colloidal particles contained alumina sol, γ-AlOOH nano-dispersion, yttria sol, glacial acetic acid and polyvinylpyrrolidone, then prepares a gel continuous fiber by adopting a dry spinning technique, and carries out a heat treatment to obtain the yttrium aluminum garnet continuous fiber.

10 Claims, 3 Drawing Sheets

PREPARATION METHOD FOR YTTRIUM ALUMINUM GARNET CONTINUOUS FIBER

TECHNICAL FIELD

The invention relates to a preparation method for continuous yttrium aluminum garnet (YAG) fiber, belonging to the field of inorganic non-metal materials.

BACKGROUND TECHNIQUE

Alumina fiber is a kind of high-performance inorganic fiber, and its main component is alumina, and some also contains non-metal oxides such as silicon oxide, boron oxide and metal oxide components such as zirconium oxide and magnesium oxide. It can be divided into short fiber, continuous fiber, whisker and other different types. The diameters of the fibers are generally about 10 µm and the length can reach up to several kilometers, or even longer. The continuous YAG fiber belongs to chemically stable alumina fibers, which is a composite of $Al_2O_3$ and $Y_2O_3$ with a melting point of up to 1970° C. YAG fiber not only exhibits excellent properties such as high strength, high modulus and high temperature resistance, but also shows high temperature creep resistance and have been widely used as insulating refractory material and structural reinforcing material.

At present, the melting method or chemical method has been used for preparing the YAG fiber. The melting method generally uses aluminum oxide and yttrium oxide as raw materials, and the molten liquid is formed by heating at a high temperature, then the melt is spun into fibers (see: Bull. Chin. Ceramic Soc. 2009, 28, 132). $Al_2O_3$ and $Y_2O_3$ melts were mixed by Mileiko et al. in a stoichiometric ratio, the mixture was infiltrated into a molybdenum-based mold with a continuous cylindrical channel, and it crystallized in the channel to form fibers. After the fiber and the mold were separated, the YAG fiber were obtained, and the bending strength of the fiber was up to 1 GPa, and the creep strength is 169 MPa at 1100° C. (see: J. Eur. Ceram. Soc. 2002, 22, 1831). $Al_2O_3$ and $Y_2O_3$ were melted in proportion by Maston et al., and then $Al_2O_3$/YAG eutectic fibers were directly drawn by using a special equipment (see: J. Eur. Ceram. Soc. 1999, 19, 2487). However, due to the high melting point of YAG, the preparation of YAG fiber by melt method requires high temperature resistant equipment, and the preparative process is difficult and costly, which limits the development of YAG fiber.

The chemical method mainly adopts the sol-gel method, which is that a compound containing a chemically active component is solidified by a solution, a sol or a gel, and then heat-treating the oxide or other compound solid. The spinnable YAG sol was prepared by use of aluminum isopropoxide and yttrium isopropoxideas precursors, and water, hydrochloric acid, nano-alumina powder and viscosity modifier as additives by Towata et al. The as-prepared gel fiber using metal alkoxide was sintered at high temperature to form YAG fiber, or YAG/$Al_2O_3$ eutectic fibers (see: Composites Part A 2001, 32, 1127), because the metal alkoxide is relatively expensive, the cost is too high to limit the development of YAG materials, and YAG fiber was prepared through the sol-gel route by Pullan et al. by use of $Al(NO_3)_3$, $YCl_3$ or $Y(NO_3)_3$ as the raw material, ammonia as the precipitant, nitric acid as the peptizer. The short fiber was prepared by use of the blow spinning technology (See: Mater. Lett. 1999, 39, 173). YAG/$Al_2O_3$ composite fibers was prepared by Shojaie-Bahaabad through the sol-gel process by using aluminum powder, aluminum chloride, hydrochloric acid and $Y_2O_3$ as raw materials in which the rheologicaland spinning properties of the gel was only analyzed in detail, but other properties such as fiber strength did not be discussed. Afterheat-treatment, the grain size of the ceramic fiber is between 100 nm and 200 nm (see: Ceram. Int. 2007,7, 32). A method for the preparation of the YAG fiber is described in US005217933A, in which the YAG fiber was prepared by using aluminum chloride, aluminum powder, formic acid, acetic acid, lactic acid and nitric acid as raw materials according to the different molar ratios of $Y_2O_3$ and aluminum oxide, in which a large amount of organic acid were added, leading to a complicated synthetic reaction of the sol.

The polycrystalline YAG fibers were prepared by Li Chengshun et al. using cheap aluminum powders, industrial hydrochloric acid and barium acetate as the raw materials. The single-phase YAG were formed after heat treatment at 900° C., however, after heat treatment at 1550° C., the as-obtained polycrystalline YAG fiber has an average particle diameter of ca.200 nm and a tensile strength of 485 MPa (see: J. Chin. Ceram. Soc. 2009, 37, 1165). CN105002601A described a preparation method of $Al_2O_3$-YAG composite fiber or YAG fiber by using aluminum chloride, aluminum micro-powders, cerium nitrate, cerium acetate and acetic acid as raw materials, and the YAG gel fiber was also prepared by centrifugal spinning. After drying and heat treatment, a polycrystalline $Al_2O_3$-YAG fiber or a single-phase YAG fiber is obtained. However, the fiber described in the above literature obtained by a centrifugal twisting technique is a short fiber, and not capable of 2-dimensional or 3-dimensional weaving. CN102011215A described a method for preparing continuous YAG fiber by sol-gel method, in which inorganic aluminum salt, metal aluminum, $Y_2O_3$ and acetic acid were used as raw materials, and a certain amount of spinning additives was added, and then the solution was concentrated. A YAG-based fiber strand is obtained, and the gel fiber is dried and sintered to form a YAG-based continuous fiber. However, the inventers does not discuss the fiber length, and this method takes too much time in the preparation process of the spinning solution, and if the fiber is industrially produced, the production efficiency is low.

SUMMARY OF THE INVENTION

The present invention provides a method for preparing a continuous YAG fiber which is simple and controllable in operation, short in production cycle, low in cost, and easy to realize industrialization.

The invention described one method for preparing the YAG continuous fiber in a sol containing colloidal $Al_{13}$ particles, a monodispersed γ-AlOOH (hydrated alumina) solution and a $Y_2O_3$ sol were adopted as raw materials, and glacial acetic acid and dilute nitric acid in proportion to control the pH value and polyvinylpyrrolidone (PVP) as spinning additive. After then, the YAG gel fiber is obtained through the sol-gel combined with dry-spun process, and the gel fiber was calcined to form ceramic fiber.

The Technical Program of the Present Invention is as Follows:

A method for preparing continuous YAG fiber comprises the following processes:
(1) Preparation of the Spinnable Sol The alumina sol containing $Al_{13}$ colloidal particles and the γ-AlOOH solution are mixed and added to the $Y_2O_3$ sol, stirred in a water bath of 30-40° C., the glacial acetic acid is added during the stirring, and then the pH value is adjusted to 1-3 by dilute nitric acid into the sol PVP as the spinning additive is added, after mixing and stirring evenly, the spinning sol was aged at 25-80° C. to transform the spinnable sol, its viscosity was up to 400-600 Pa·s.

The alumina sol containing colloidal $Al_{13}$ particles has an alumina content of 15-35 wt %, the $Y_2O_3$ sol has a solid content of 10-30 wt %, and the monodispersed γ-AlOOH has a solid content of 8.5-15 wt %, and $Y_2O_3$ and the molar ratio of glacial acetic acid is 1:(1-2), the amount of PVP is 0.5-5 wt % of the total solid content. The main components of the alumina sol and γ-AlOOH solution containing colloidal $Al_{13}$ particles are based on alumina. The molar ratio of $Y_2O_3$ to aluminum oxide is 1: (1-2).

(2) Dry Spinning to Prepare YAG Gel Fiber

The spinnable sol prepared in the process (1) is dry-spun to form YAG gel fiber, and the dry-spun conditions are as follows: the number of the spinneret holes is 15-800, and the diameter of the spinneret is 0.06-0.15 mm, the wire take-up speed is 60-180 m/min, the environment temperature is 18-40° C., and the relative humidity (RH) is 20-70%.

(3) The Ceramization of YAG Gel Fiber

The YAG gel fiber formed in the process (2) is ceramized, heated to 450-600° C. at a rate of 0.5-3° C./min, and incubated at this temperature for 0.5-2 h, and then raised to 900-1400° C. at a rate of 3-10° C./min, and at that temperature maintained at 0.5-2 h, the continuous YAG fiber is prepared.

According to the present invention, preferably, the mass fraction of colloidal $Al_{13}$ particles in the sol in process (1) is 20-25 wt %, the γ-AlOOH is 10-15 wt %, the $Y_2O_3$ content is 15 wt %, and the spinning additive PVP in sol is an amount of 1 wt % of the total solid content.

According to the present invention, preferably, the mass ratio of the alumina in $Al_{13}$ colloidal solution to the solid in the γ-AlOOH sol is (3-9):1.

According to the present invention, preferably, the aging temperature in the process (1) is 35-50° C., and the viscosity is up to 450-550 Pa·s after aging.

According to the present invention, preferably, the aging in the process (1) is carried out under the vacuum degree of 0.095 MPa.

According to the present invention, preferably, the molar ratio of $Y_2O_3$ to glacial acetic acid in the process (1) is 1:(1.1-1.5).

According to the invention, it is preferred to that the dilute nitric acid is added to adjust the pH value to 1.5-2.5.

According to the present invention, preferably, the sol containing colloidal $Al_{13}$ particles described in the process (1) is prepared as follows:

The aluminum powder and the aluminum salt solution are used as raw materials, and the molar ratio of the aluminum salt to the aluminum powder is 1:(1-5), and the reaction is heated to reflux until the aluminum powder is completely reacted, after then the as-formed colloidal $Al_{13}$ solution is cooled, and filtered. The size of the colloidal particle is ca.5nm. Preferably, the aluminum salt may be aluminum chloride, aluminum nitrate or aluminum sulfate.

According to the present invention, preferably, the spinneret has a pore size of 0.06-0.10 mm and a take-up speed of 80-140 m/min in the process (2).

According to the present invention, preferably, the environment temperature in the process (2) is 25-35° C., and the relative humidity (RH) is 30-45%.

According to the present invention, preferably, the YAG gel fiber in process (3) is heated to 450-600° C. at a rate of 0.8-1° C./min, and maintained at that temperature for 1-2 h, furthermore the temperature is raised to 900-1400° C. at a rate of 3-10° C./min, and also maintained at that temperature for 1-2 h.

The crystal phase of continuous YAG fiber prepared by the method in this invention belongs to a cubic crystal system and has a garnet crystal structure, the diameter of the fiber is 6-12 μm, and the fiber length can reach several kilometers, the fiber surface is smooth and the internal structure is dense, and the fiber has very excellent flexibility and high strength.

The Principle of the Invention:

The preparation process of the spinnable sol in the invention is a mixture of several inorganic sols, in which the uniformity of the sol can be well controlled, and the raw materials can easily react to form the linear particles through the hydrolysis and polycondensation, thereby facilitating the production of high poly-chain of colloidal particles with less branching. The addition of glacial acetic acid to the sol is beneficial to improve the spinning performance of the sol, which may be due to the fact that the acetate cation produced by the hydrolysis of acetic acid combining with the metal ion to form a complex, thereby forming a chain or network structure between the molecules, which is favorable for the performance of the spinnable sol.

The invention adopts the dry-spun technology to prepare continuous YAG fiber, wherein the spinneret has a hole number of 15-800 and a pore diameter of 0.06-0.15 mm, which is made of special alloy steel. The spinnable sol is extruded from the orifice of the spinneret into the spinning tunnel to exchange heat with the flow of hot environment flowing into the ramp, and the solvent in the trickle stream is rapidly volatilized and carried away by the stream. While gradually removing the solvent, the fine stream of the raw sol is solidified, and is elongated and thinned by the winding force of the wire take-up machine to form nascent fibers, which are wound around the take-up rolls. The spinning speed depends mainly on the nature of the sol and the volatilization rate of the solvent. This method makes it easier to produce continuous fibers than other methods.

The Technical Features and Excellent Effects of the Present Invention are as Follows:

1) The continuous YAG fiber prepared by the invention has uniform diameter, the length of fiber has reached up to the scale of kilometers, the fiber surface is smooth and the internal structure is dense, is not easy to break, and has good flexibility. In addition, the fiber has good thermal stability and stable mechanical properties. The average tensile strength of the fiber which has good resistance to high temperature creep after heat treatment at 1200° C. can reach to 1.0 GPa.

2) The preparation process to the sol in the invention is simple in operation, can greatly reduce the preparation time of the spinnable sol, has a short production cycle, and is easy to realize industrialization.

3) The continuous YAG fiber is prepared by the sol-gel method, and the as-prepared sol is stable in nature and can be stored for a long time.

4) The aging process in the invention is carried out under the vacuum degree of 0.095 MPa, which greatly reduces the aging time of sol and can be industrially prepared.

5) The invention adopts the dry-spun, the spinning speed is high and the structure of the as-obtained fiber is relatively dense, and the continuous fiber is more easily produced comparing with other methods, and the continuous YAG fiber obtained by the invention can be several kilometers in length. The fiber is wound around a take-up roll using a wire take-up device.

DETAILED DESCRIPTION

The present invention will be further described below in conjunction with the embodiments, but is not limited thereto.

The spinnable sol containing colloidal $Al_{13}$ particles described in the examples was prepared as follows:

The aluminum powders and the aluminum salt solution are used as raw materials, and the molar ratio of the aluminum salt to the aluminum powder is 1:(1-5), and the mixed solution is heated to reflux until the aluminum powder is completely reacted, cooled, and filtered to form an alumina sol containing colloidal $Al_{13}$ particles. The sol has a mass content of 20-25 wt %, the size of the colloidal particle is 5 nm, and the aluminum salt may be aluminum chloride, aluminum nitrate, or aluminum sulfate.

Example 1

A method for preparing continuous YAG fiber comprises the following processes:
(1) Preparation of Spinnable Sol 925.2 g of the sol containing $Al_{13}$ colloidal particles (solid content: 22.04 wt %) and 419.6 g of γ-AlOOH nanodispersion (solid content: 12.15 wt %) were mixed, and stirred until to form a homogeneous mixture, according to $n(Al_2O_3):n(Y_2O_3)=5:3$ metering composition 2258.1 g of $Y_2O_3$ sol (solid content is 15 wt %) is added, stirring in water bath at 35° C., 450 g of glacial acetic acid is added during the stirring process, wherein the molar ratio of $Y_2O_3$ to glacial acetic acid is 1:1.25, then 173 g of dilute nitric acid is added to adjust the pH value to 2.0, 39.6 g of PVP solution is added, being stirred and mixed well.

The aging temperature was set to 40° C., the aging process was carried out under the vacuum degree of 0.095 MPa, and the viscosity of the mixed sol was aged up to 500 Pa·s to form a spinnable sol.

(2) Dry-Spinning to Form Gel Fiber

Figure 2:
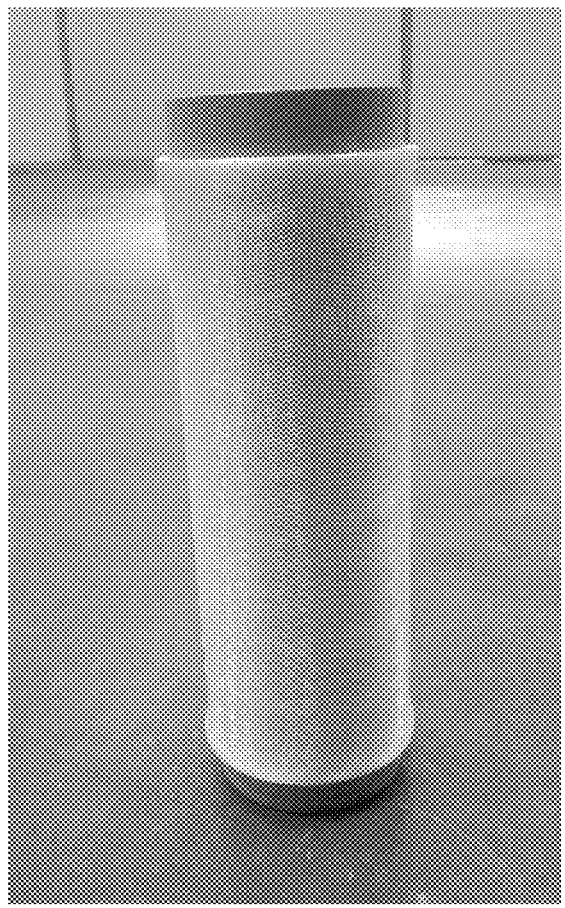
FIG. 2 is an optical image of a continuous YAG gel fiber in Example 1 of the present invention.

The spinnable sol prepared in the process (1) is dry-spun to form a YAG gel fiber. The preparative conditions are as follows: the spinneret has a pore diameter of 0.06 mm, the wire take-up speed is 100 m/min, and the environment temperature is 25-30° C. The relative humidity (RH) is 30-40%, as shown in FIG. 2, the fiber length can reach several kilometers.

(3) The Ceramization of the YAG Gel Fiber

The YAG gel fiber prepared in the process (2) is ceramized, and the preparative conditions are as follows: the temperature is raised to 500° C. at a speed of 1° C./min, kept at that temperature for 1 h, then the temperature is raised to 1200° C. at a rate of 5° C./min, and maintained at that temperature for 2 h to form continuous YAG fiber.

The as-prepared continuous YAG fiber has a diameter of 7.7-8.5 μm and a fiber shrinkage of about 30% at volume. The fiber surface is smooth and the internal structure is dense. The XRD pattern show that the crystal phase of the fiber is a YAG structure, its average tensile strength is 932 MPa.

Figure 1:
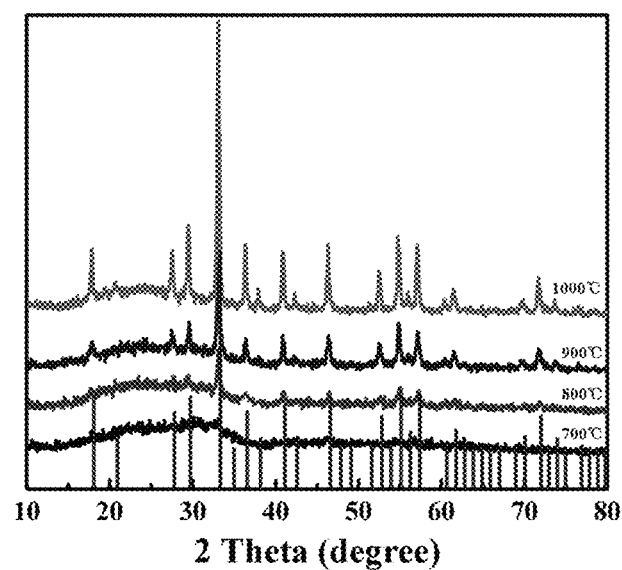
FIG. 1 is the XRD pattern of as-formed continuous YAG gel fibers after sintered at different temperatures in Example 1 of the present invention.

In the process (3) for the ceramization of YAG gel fiber, the final sintering temperature was selected to be 700° C., 800° C., 900° C., 1000° C., and the XRD pattern of the continuous YAG fiber shown in FIG. 1, the YAG fiber sintered at 800° C. starts pomegranate, and when the sintering temperature is 1000° C., it is completely converted into a YAG structure.

Figure 3:
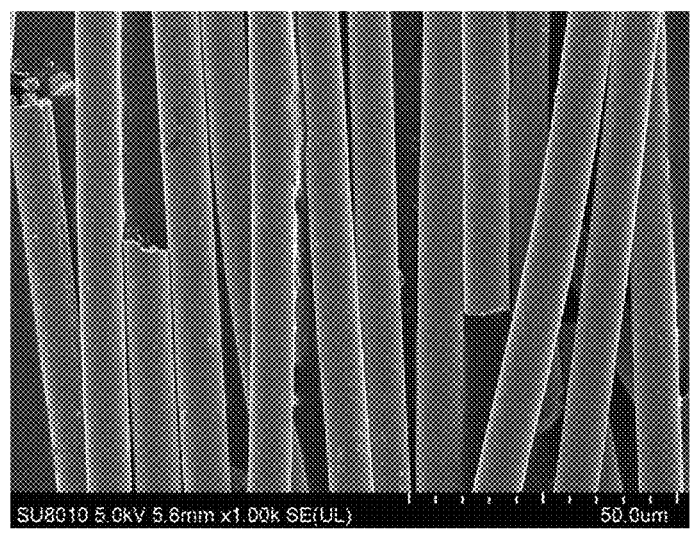
FIG. 3 is a SEM image of a continuous YAG fiber in Example 1 of the present invention.
Figure 4:
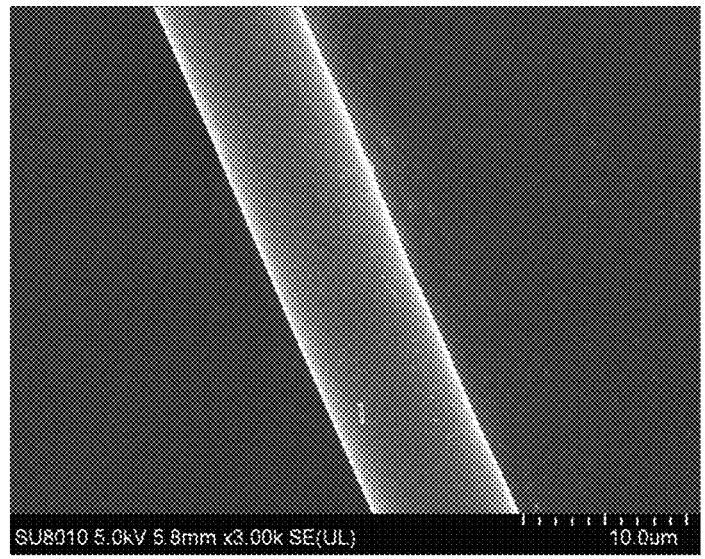
FIG. 4 is a high magnification SEM image of continuous YAG fiber in Example 1 of the present invention.
Figure 5:
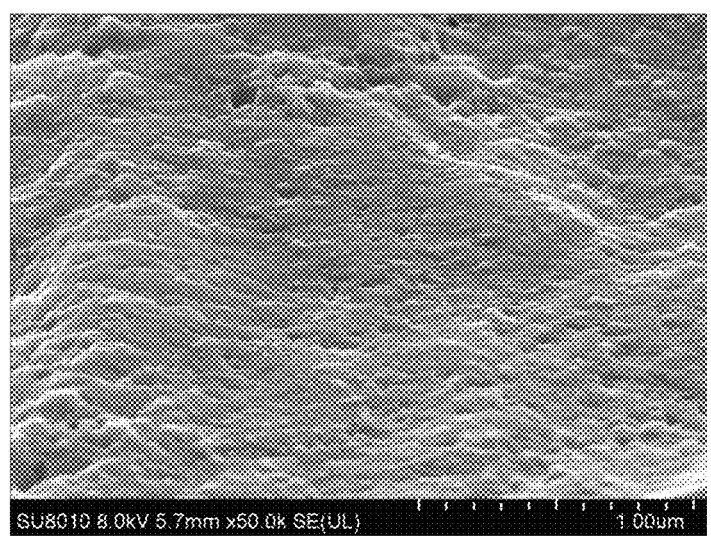
FIG. 5 is a SEM image showing a high magnification of a cross section of a continuous YAG fiber in Example 1 of the present invention.

The SEM image of the continuous YAG fiber in this example is shown in FIG. 3. The high-magnification SEM image is shown in FIG. 4, and the SEM image of the fiber cross-section magnification is shown in FIG. 5. It can be seen from FIGS. 3, 4 and 5 that the fiber has a uniform diameter and a smooth surface. The internal structure of the fiber is dense and the number of pores between the grains is small, which is favorable for the mechanical strength of the fiber.

Comparative Example 1

A method for preparing continuous YAG fiber comprises the following processes:
(1) Preparation of Spinnable Sol 1156.5 g of a sol containing $Al_{13}$ colloidal particles (solid content: 22.04 wt %) and 2258.1 g of $Y_2O_3$ sol (solid content: 15 wt % by weight) were mixed at a ratio of $n(Al_2O_3):n(Y_2O_3)=5:3$. The mixture was stirred in water bath at 35° C. During the stirring, 450 g of glacial acetic acid was added, wherein the molar ratio of $Y_2O_3$ to glacial acetic acid was 1:1.25, then 138 g of dilute nitric acid was added to adjust the pH value to 2.0, and 98.9 g of PVP solution was added, and the mixture was stirred and homogenized.

The aging temperature was set to 40° C., the aging process was carried out under the vacuum degree of 0.095 MPa, and the mixed sol was aged to a viscosity of 513 Pa·s to form a spinnable sol.

(2) Dry-Spun to Prepare Gel Fiber

The sol prepared in the process (1) is dry-spun to form a YAG gel fiber. The preparative conditions are as follows: the spinneret has a pore diameter of 0.06 mm, the wire take-up speed is 80 m/min, and the environment temperature is 25-30° C., the RH is 30-40%.

Process (3) is the same as in Embodiment 1.

The as-prepared continuous YAG fiber has a diameter of 9.5-10.2 μm. The gel fiber is easy to break and the diameter is coarse during the spinning process, and the fiber shrinkage rate is about 33% at volume, the fiber surface has slag balls and the internal structure is not dense, the XRD pattern show that the crystal phase of the fiber is a YAG structure, and the average tensile strength of the fiber is 494 MPa. It can be seen that the sol containing $Al_{13}$ colloidal particles alone is used as the alumina source, which seriously affects the tensile strength of the continuous YAG fiber.

Example 2

A method for preparing continuous YAG fiber comprises the following processes:
(1) Preparation of Spinnable Sol 925.2 g of the sol containing colloidal $Al_{13}$ particles (solid content: 22.04 wt %) and 419.6 g of γ-AlOOH nanodispersion (solid content: 12.15 wt %) were mixed, and stirred until to form the homogeneous mixture, according to $n(Al_2O_3):n(Y_2O_3)=5:3$ metering composition. 2258.1 g of $Y_2O_3$ sol (solid content 15 wt %) is added, stirred in water bath at 35° C., 450 g of glacial acetic acid was added during the stirring process, wherein the molar ratio of $Y_2O_3$ to glacial acetic acid is 1:1.25, the pH value was 3.8 after 98.9 g of PVP solution was added, the mixture was stirred and mixed uniformly.

The aging temperature is set to 40° C., the aging process is carried out under the condition of vacuum degree of 0.095 MPa, and the mixed sol is aged to a viscosity of 496 Pa·s to form the spinnable sol.
Process (2) is the same as in example 1.
Process (3) is the same as in example 1.

The continuous YAG fiber has a diameter of 7.8-9.0 μm, its shrinkage is about 32%, the fiber surface is smooth, but the number of pores between the grains is large, and the XRD pattern shows that the fiber is a YAG structure. The average tensile strength of the fiber was 583 MPa.

Example 3

A method for preparing continuous YAG fiber comprises the following processes:
(1) Preparation of Spinnable Sol 925.2 g of the sol containing colloidal $Al_{13}$ particles (solid content: 22.04 wt %) and 419.6 g of γ-AlOOH nanodispersion (solid content: 12.15 wt %) were mixed, and stirred until to form homogeneous solution, according to $n(Al_2O_3):n(Y_2O_3)=5:3$ metering composition. 2258.1 g of $Y_2O_3$ sol (solid content 15 wt %) is added, stirred in water bath at 35° C., 486 g of glacial acetic acid is added during the stirring process, wherein the molar ratio of $Y_2O_3$ to glacial acetic acid is 1:1.35, then 195 g of dilute nitric acid is added to adjust the pH value to 1.8, 98.9 g of PVP solution is added, stirred and mixed evenly.

The aging temperature was set to 40° C., the aging process was carried out under the vacuum degree of 0.095 MPa, and the viscosity of mixed sol was up to 520 Pa·s to form a spinnable sol.
Process (2) is the same as in Embodiment 1.
Process (3) is the same as in Embodiment 1.

The as-prepared continuous YAG fiber has a diameter of 7.8-9.0 μm, its shrinkage is about 32%, the fiber surface is smooth, the internal structure is dense, and the XRD pattern showed that the fiber is a YAG structure, and the average tensile strength of the fiber is 913 MPa.

Example 4

A method for preparing continuous YAG fiber comprises the following processes:
(1) Preparation of Spinnable Sol 925.2 g of the sol containing colloidal $Al_{13}$ particles (solid content: 22.04 wt %) and 419.6 g of γ-AlOOH nanodispersion (solid content: 12.15 wt %) were mixed, and stirred until to form homogeneous mixture according to $n(Al_2O_3):n(Y_2O_3)=5:3$ metering composition. 2258.1 g of $Y_2O_3$ sol (solid content 15 wt %) was added, stirred in water bath at 35° C., 720 g of glacial acetic acid was added during the stirring process, wherein the molar ratio of $Y_2O_3$ to glacial acetic acid was 1:2, then 159 g of dilute nitric acid was added to adjust the pH value to 1.8 after 98.9 g of PVP solution was added, stirred and mixed well.

The aging temperature was set to 40° C., the aging process was carried out under the vacuum degree of 0.095 MPa, and the mixed sol was aged to a viscosity of 515 Pa·s to form a spinnable sol.

(2) Dry-Spun to Prepare Gel Fiber

The sol prepared in the process (1) is dry-spun to form a YAG gel fiber. The preparative conditions are as follows: the spinneret has a pore diameter of 0.06 mm, the wire take-up speed is 80 m/min, and the environment temperature is 25-30° C., the RH is 30-40%, as shown in FIG. 2, the fiber length can reach several kilometers.
Process (3) is the same as in Embodiment 1.

The continuous YAG fiber has a diameter of 8.5-9.5 μm, and the gel fiber is easy to break and has a relatively large diameter during spinning, its shrinkage is about 34%, the fiber surface is smooth, and the number of pores between the grains is large, XRD pattern shows that the fiber is a YAG structure, and its average tensile strength is 700 MPa.

Example 5

A method for preparing continuous YAG fiber comprises the following processes:
Process (1) is the same as in Example 1.
(2) Dry-Spun to Prepare Gel Fiber The sol prepared in the process (1) is dry-spun to form a YAG gel fiber. The preparative conditions are as follows: the spinneret has a pore diameter of 0.1 mm, the wire take-up speed is 120 m/min, and the environment temperature is 30-35° C., the RH is 30-40%.
(3) The Ceramization of YAG Gel Fiber The YAG gel fiber prepared in the process (2) is ceramized, and the preparative conditions are as follows: the temperature is raised to 500° C. at a rate of 0.8° C./min, kept at that temperature for 1 h, and then heated to 1200° C. at a rate of 4° C./min, maintained at that temperature for 2 h to form continuous YAG fiber.

The as-obtained continuous YAG fiber has a diameter of 8.5-9.8 μm and a shrinkage of about 30%. The fiber surface is smooth and the internal structure is dense. XRD pattern shows that the fiber is a YAG structure, and the average tensile strength of the fiber is 826 MPa.

Example 6

A method for preparing continuous YAG fiber comprises the following processes:
(1) Preparation of Spinnable Sol 809.6 g of the sol containing colloidal $Al_{13}$ particles (solid content: 22.04 wt %) and 629.4 g of γ-AlOOH nanodispersion (solid content: 12.15 wt %) were mixed, and stirred to form a uniform mixture according to $n(Al_2O_3):n(Y_2O_3)=5:3$ metering composition. 2258.1 g of $Y_2O_3$ sol (solid content 15 wt %) is added, stirred in water bath at 35° C., 450 g of glacial acetic acid is added during the stirring process, wherein the molar ratio of $Y_2O_3$ to glacial acetic acid is 1:1.25, then 173 g of dilute nitric acid is added to adjust the pH value to 2.0, 39.6 g of PVP solution is added, stirred and mixed well.

The aging temperature was set to 40° C., the aging process was carried out under the vacuum degree of 0.095 MPa, and the viscosity of solution was up to 485 Pa·s to form a spinnable sol.
Process (2) is the same as in Embodiment 1.
Process (3) is the same as in Embodiment 1.

The continuous YAG fiber has a diameter of 7.1-8.5 μm and a shrinkage of about 30%. The fiber surface is smooth and the internal structure is dense. XRD pattern shows that the fiber was a YAG structure, and the average tensile strength of the fiber is 809 MPa.

Example 7

A method for preparing continuous YAG fiber comprises the following processes:

(1) Preparation of Spinnable Sol 925.2 g of the sol containing colloidal $Al_{13}$ particles (solid content: 22.04 wt %) and 419.6 g of γ-AlOOH nanodispersion (solid content: 12.15 wt %) were mixed, and stirred until to form a homogeneous mixture according to $n(Al_2O_3):n(Y_2O_3)=5:3$ metering composition. 2258.1 g of $Y_2O_3$ sol (solid content of 15 wt %) was added, then 54.9 g of zirconium acetate with a solid content of 22% was added, stirring in water bath at 35° C., 450 g of glacial acetic acid was added during the stirring process, in which the molar ratio of $Y_2O_3$ to glacial acetic acid was 1:1.25, finally 173 g of dilute nitric acid was added to adjust the pH value to 2.0, 40.4 g of PVP solution was added, stirred and mixed uniformly.

The aging temperature was set to 40° C., the aging process was carried out under the condition of a vacuum degree of 0.095 MPa, and the viscosity of solution was up to 500 Pa·s to form a spinnable sol.

Process (2) is the same as in Embodiment 1.

Process (3) is the same as in Embodiment 1.

The obtained continuous YAG fiber has a diameter of 6.7-8.5 μm and a shrinkage of about 29%. The fiber surface is smooth and the internal structure is dense. XRD pattern shows that the fiber is a YAG structure, and the average tensile strength of the fiber is 950 MPa.

Example 8

A method for preparing continuous YAG fiber comprises the following processes:

(1) Preparation of Spinnable Sol 1184.3 g of the sol containing colloidal $Al_{13}$ particles (solid content: 22.04 wt %) and 537.1 g of γ-AlOOH nanodispersion (solid content: 12.15 wt %) were mixed, and stirred to form uniform mixture according to $n(Al_2O_3):n(Y_2O_3)=2:1$ metering composition. 2408.6 g of $Y_2O_3$ sol (solid content was 15 wt %) was added, stirred in water bath at 35° C., 450 g of glacial acetic acid was added during stirring process, and the molar ratio of $Y_2O_3$ to glacial acetic acid was 1:1.25, then 206 g of dilute nitric acid was added to adjust the pH value to 2.0, 45.8 g of PVP solution was added, stirred and mixed well.

The aging temperature was set to 40° C., the aging process was carried out under the vacuum degree of 0.095 MPa, and the solution was aged to a viscosity of 515 Pa·s to form a spinnable sol.

(2) Dry-Spun to Prepare Gel Fiber

The sol prepared in the process (1) is dry-spun to form a YAG gel fiber. The preparative conditions are as follows: the spinneret has a pore diameter of 0.06 mm, the wire take-up speed is 100 m/min, and the environment temperature is 25-30° C., the RH is 25-35%.

(3) The Ceramization of the YAG Gel Fiber

YAG gel fiber is prepared in process (2).

What is claimed is:

1. A method for preparing a continuous YAG fiber comprises the following steps:
   (1) preparation of a spinnable sol
   a sol containing colloidal $Al_{13}$ particles are mixed with a γ-AlOOH nanodispersion which is added into a $Y_2O_3$ sol, stirred in a water bath of 30-40° C., a glacial acetic acid is added during the stirring process, and then pH value is adjusted to 1-3 by adding dilute nitric acid; a spinning additive PVP is added, stirred and mixed evenly, an aging temperature is set to 25-80° C. until viscosity of solution is up to 400-600 Pa·s to form the spinnable sol;
   the sol containing colloidal $Al_{13}$ particles has an alumina content of 15-35 wt %, the $Y_2O_3$ sol has a solid content of 10-30 wt %, and the γ-AlOOH nanodispersion has a solid content of 8.5-15 wt %, and a molar ratio of $Y_2O_3$ to glacial acetic acid is 1:(1-2), the amount of the PVP is added in 0.5-5 wt % of total solid content; a molar ratio of $Y_2O_3$ to aluminum oxide is 1:(1-2); (2) dry-spun to prepare a YAG gel fiber
   the spinnable sol prepared in the step (1) is dry-spun to form the YAG gel fiber at a condition: 15-800 of spinnerets is used, and diameter of a spinneret is 0.06-0.15 mm, a wire take-up speed is 60-180 m/min, environment temperature is 18-40° C., a relative humidity (RH) is 20-70%; and
   (3) ceramization of the YAG gel fiber
   the YAG gel fiber formed in the step (2) is ceramized by being heated to 450-600° C. at a rate of 0.5-3° C./min, and incubated for 0.5-2 hours, then the temperature is increased to 900-1400° C. at the rate of 3-10° C./min and incubated for 0.5-2 hours which yields the continuous YAG fiber.

2. The method according to claim 1, wherein the mass of the colloidal $Al_{13}$ particles in the sol containing the colloidal $Al_{13}$ particles in the step (1) is 20-25 wt %, the solid content of the γ-AlOOH nanodispersion is 10-15 wt %, the solid content of the $Y_2O_3$ sol is 15 wt %, and the spinning additive PVP is added in an amount of 1 wt % of the total solid content.

3. The method according to claim 1, wherein the mass ratio of γ-AlOOH nanodispersion to the $Al_{13}$ colloids in the sol is (3-9):1.

4. The method according to claim 1, wherein the aging temperature in the step (1) is 35-50° C., and the viscosity is 450-550 Pa·s.

5. The method according to claim 1, wherein after the pH value is adjusted in the step (1), a vacuum of 0.095 MPa is applied.

6. The method according to claim 1, wherein the molar ratio of the $Y_2O_3$ to the glacial acetic acid in the step (1) is 1:(1.1-1.5).

7. The method according to claim 1, wherein the pH value is adjusted to 1.5-2.5.

8. The method according to claim 1, wherein in the process (2), the spinneret has a pore diameter of 0.06-0.10 mm, and the wire take-up speed is 80-140 m/min.

9. The method according to claim 1, wherein the environment temperature in the step (2) is 25-35° C., the RH is 30-45%.

10. The method according to claim 1, wherein the YAG gel fiber in the step (3) is heated to the temperature of 450-600° C. at the rate of 0.8-1° C./min, and incubated for 1-2 hours, then the temperature is increased to 900-1400° C. at the rate of 3-5° C./min, and incubated for 1-2 hours.

* * * * *